A. D. IMRIE.
DRAG HARROW.
APPLICATION FILED MAR. 15, 1909.
952,251.
Patented Mar. 15, 1910.
4 SHEETS—SHEET 1.
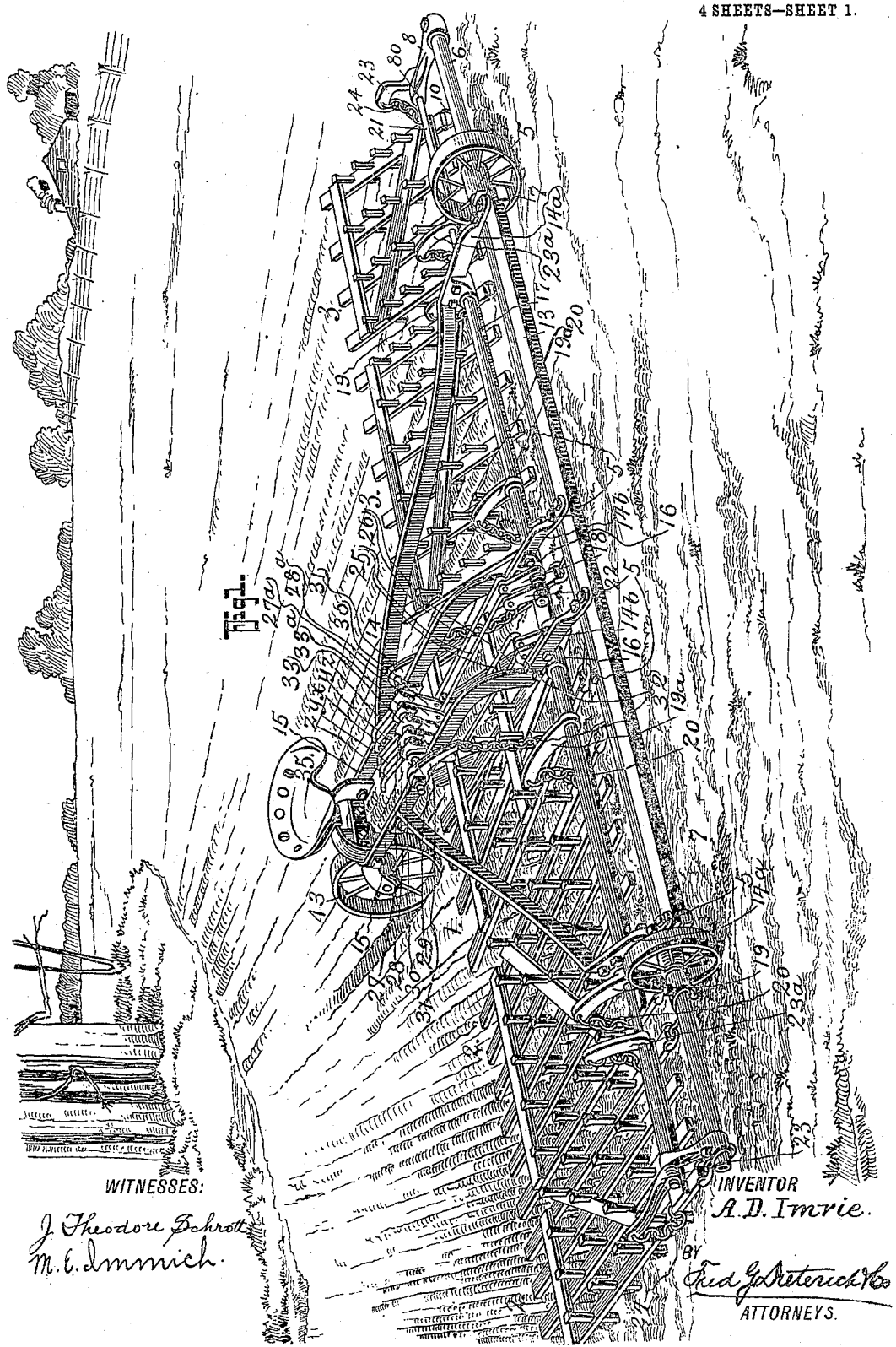
WITNESSES:
J. Theodore Schrott
M. E. Immich
INVENTOR
A. D. Imrie.
BY
Fred G. Dieterich & Co
ATTORNEYS.

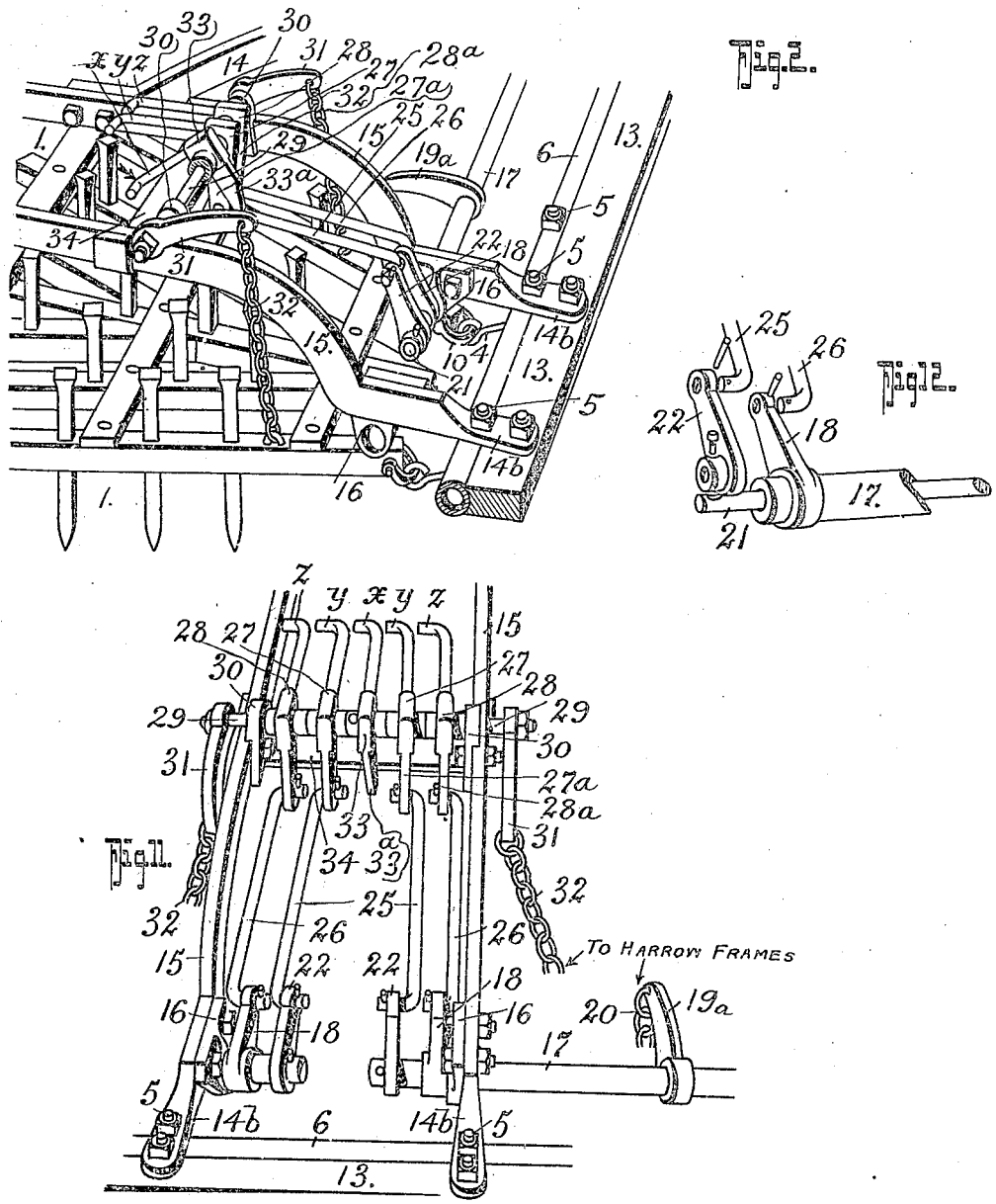

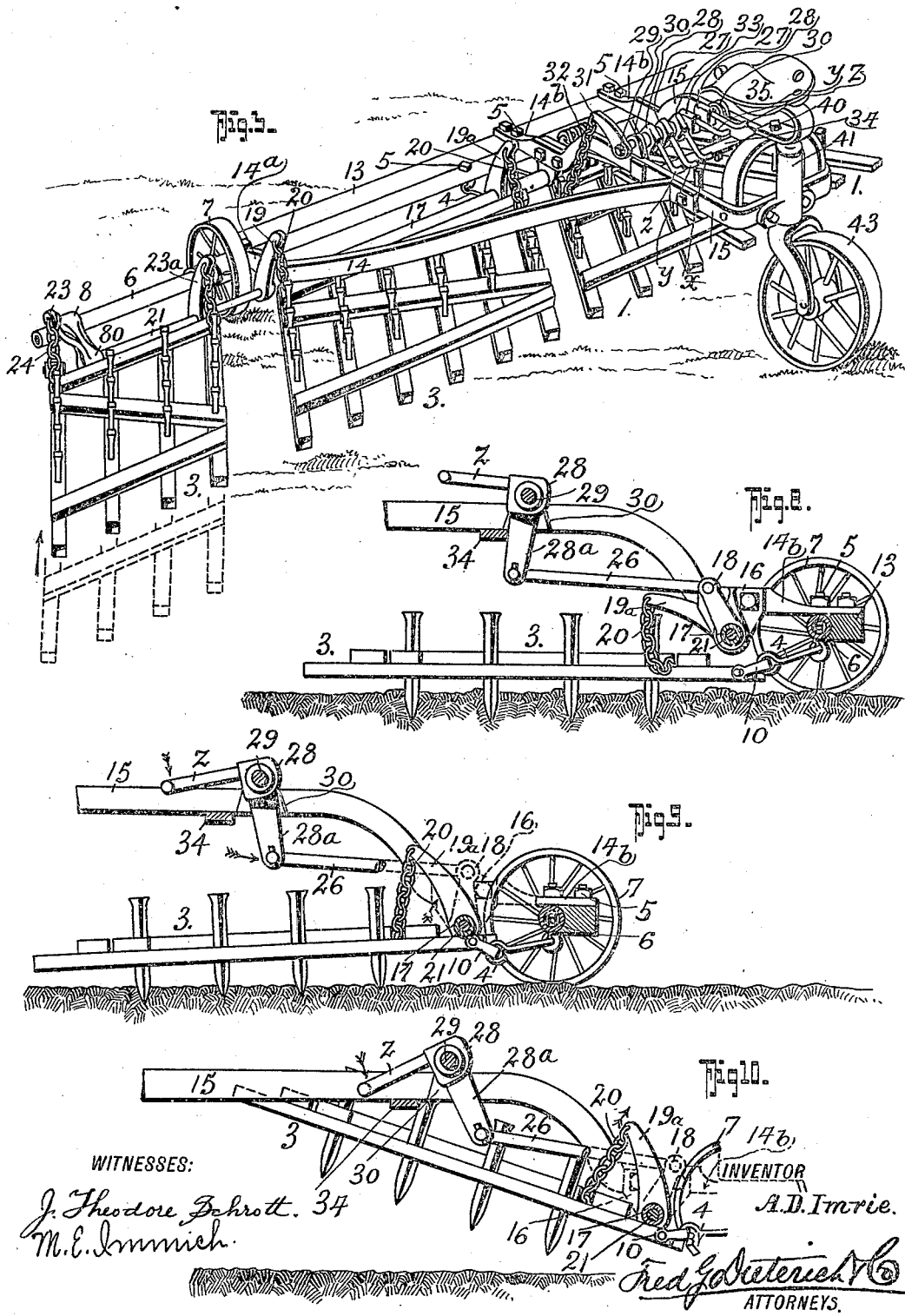

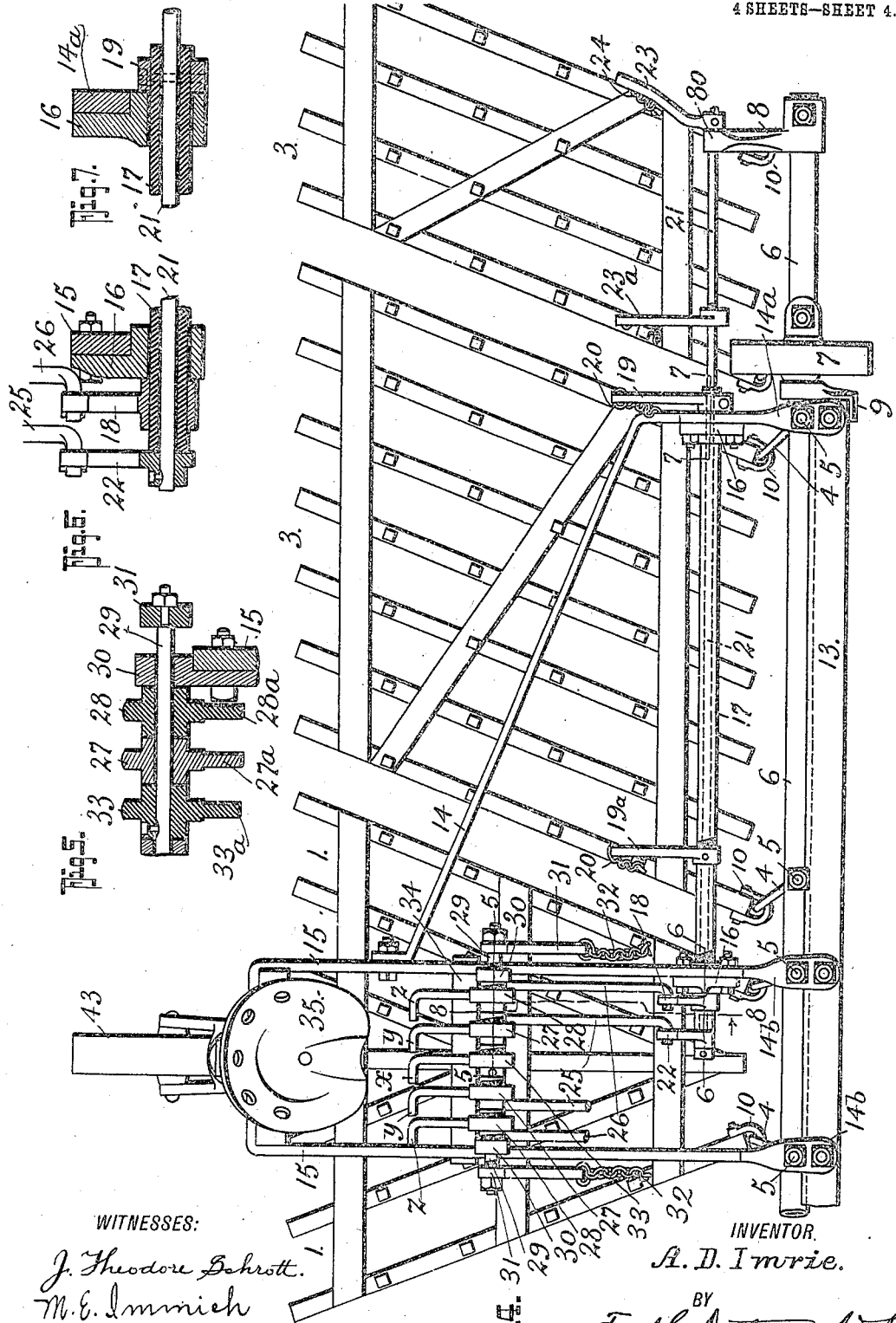

UNITED STATES PATENT OFFICE.

ANDREW D. IMRIE, OF ANDOVER, SOUTH DAKOTA.

DRAG-HARROW.

952,251. Specification of Letters Patent. Patented Mar. 15, 1910.

Application filed March 15, 1909. Serial No. 483,418.

*To all whom it may concern:*

Be it known that I, ANDREW D. IMRIE, residing at Andover, in the county of Day and State of South Dakota, have invented a new and Improved Drag-Harrow, of which the following is a specification.

My invention, which generally relates to improvements in harrows, more particularly is in the nature of attachments for drag harrows, designed so that the operator can conveniently, expeditiously and without much effort, lift any one or all of the series of sections or separate harrow heads or frames without necessitating the leaving of his seat.

As is well-known, one of the serious inconveniences in the use of the ordinary types of drag harrows in which a plurality of independently movable heads or harrow frames are included, is that the farmer must leave the seat to lift the particular one or ones of the frames when it is desired to pass over very rough places, stumps, etc. and for lifting all of the frames from the ground when driving the machine across the field to or from work.

Primarily, my invention seeks to overcome the objections noted and others that will hereinafter appear, and to provide a simple and inexpensive means whereby the driver from his seat can manipulate the same to lift any one of the sections or independent frame heads.

With other objects in view that will hereinafter appear, my invention, in its generic nature, comprehends in combination with a plurality of harrow drag frames, a portable draft gear combined therewith, a lever actuated lift mechanism for each of the drag frames, each operable independently of the others, the several lever mechanisms being coöperatively assembled whereby all may be actuated at one time for simultaneously lifting all of the harrow frames from the ground.

In its more complete nature, my invention embodies in a harrow of the general type stated, means operable by the driver from his seat combined with a drag or harrow frame, coupled to the draft bar, adapted when actuated to first lift the front end of the drag or harrow frame and then lift the rear end of the said drag or frame while utilizing the front end thereof as a fulcrum bearing.

In its still more subordinate features, my invention consists in certain details of construction and peculiar combination of parts, all of which will be hereinafter fully explained, specifically pointed out in the appended claims and illustrated in the accompanying drawings, in which:

Figure 1, is a perspective view of my improved harrow in a complete form, all of the drags or head sections or frames being at their lower or dragging position. Fig. 2, is a similar view of so much of the harrow as shows the central section with the lifting attachments, the central drag section being shown at the lifted position, pressure being at this time on the foot lever $x$. Fig. 3, is a similar view, all of the sections being shown lifted, pressure now being on all the foot levers $x$, $y$ and $z$. Fig. 4, is a plan view of as much as is shown in Figs. 2 and 3, the drags being in their lower or normal position. Figs. 5, 6 and 7 are detail sections on the lines 5—5, 6—6 and 7—7 respectively on Fig. 4. Fig. 8, is a cross section taken on the line 8—8 on Fig. 4. Fig. 9, is a similar view, the drag frame being shown with the front end lifted against the longitudinal bar that acts as a fulcrum bearing for the front end of the said drag. Fig. 10, is a view similar to Fig. 9, the drag being shown lifted to its fullest extent. Fig. 11, is a perspective view that illustrates the general arrangement of the foot levers and their connections with the crank equipped rocking rods hereinafter specifically referred to. Fig. 12, is a detail perspective view hereinafter referred to.

Referring now to the structural arrangement of my improved harrow, the same, in the preferred form shown, includes a central drag or harrow frame 1 and one or more of such frames at each side of the central frame, two being shown in Fig. 1 and designated respectively 2—2 and 3—3, and the several side frames 2—3 have the usual rhomboidal shape, whereby to be in parallel alinement with the diverging sides of the V shaped central frame 1. Each of the drag frames consists of a series of tooth carrying bars braced by the cross bars in any well known manner and the front ends of the outermost ones of each of said tooth carrying bars each has a clevis 10 to which are loosely connected eye bolts 4—4, the other ends of which loosely connect with other eye bolts 5—5 attached to the front hollow draft rod 6 upon which the front wheels 7—7 of the sulky are loosely journaled, the said rod at the extreme ends having inwardly projected brackets 8—8, the purpose of which will presently appear.

Adjacent the inner face of the wheels 7 are brackets 9—9 that are clamped on the rod 6 to support the longitudinally extended wooden beam 13 to which the draft trees, in practice, are bolted in any suitable manner, and the said brackets 9 together with the rod 6 and beam 13 form a convenient bearing for the outer ends of other inwardly projected brackets 14ª—14ª that form, as it were, extensions of the brace bars 14—14 that extend obliquely inwardly and upwardly and bolt to the side bars 15—15 of the seat and lever supporting frame, composed, preferably of a single bar bent U-shape at the rear end and whose side bars extend forwardly, curve downwardly and terminate in extensions 14ᵇ—14ᵇ that bolt to the bar 6 and beam 13 as clearly shown in the drawings. To the brackets 14ª—14ª and the extensions 14ᵇ—14ᵇ are bolted pendent hangers that form hub bearings 16—16, these bearings being in longitudinal alinement with similar bearings 80 on the end brackets 8—8.

In the bearings 16 are rockably journaled the tubular shafts 17, the inner ends of which extend between the side bars 15—15 and each has a crank member 18—18 fixedly mounted thereon that projects upwardly as best shown in Fig. 8, and for the reason clearly understood by referring to the drawings, which also show that the other or outer ends of the tubular shafts have fixedly attached and rearwardly projected cranks 19—19 to which connect lift chains 20—20 that join with the drags, a supplemental crank 19ª being on each shaft 17 for the same purpose.

It should be stated the tubular shafts 17 with their crank members are utilized for lifting the first side frames, other crank rock shafts being provided for lifting the second or outermost ones of the drag frames and for conveniently actuating the said outermost ones of the side frames, a shaft rod 21 is rockably mounted in each of the tubular shafts 17 and each of the said rods 21 has its inner end projected beyond the inner crank end of the tubular shaft 17 and carries a crank arm 22 disposed adjacent the crank on the corresponding end of the shaft 17. The rods 21 extend some distance beyond the outer ends of the shafts 17 and are journaled in the hubs 80 of the brackets 8, their extreme outer ends carrying inwardly extended crank members 23, they also having other cranks 23ª, the said crank members 23—23ª carrying the lift chains 24—24 connected to the outer drag frames.

So far as described, it is manifest that by rocking the tubular shafts 17, or the rods 21 in the tubular shaft 17 the respective drag frames controlled by the said rods 21 and shafts 17 will be lifted, it being also apparent that as the shafts 17 and rods 21 may be rocked together the drag frames controlled thereby may be lifted in unison.

For actuating the rods 21 and the shafts 17 pitmen rods 25—26 are respectively connected to the cranks on the inner ends of the rods 21 and shafts 17 that extend rearwardly (see Fig. 11) and are pivotally connected with the pendent members 27ª—28ª of the bell crank levers 27—28 loosely mounted on a cross shaft 29 loosely journaled in bearings 30—30 on the tops of the side bars 15—15 and whose opposite ends have crank arms 31—31 to which connect the lift chains 32—32 that join with the central drag frame as clearly shown in the drawing, the said shaft having fixed thereon a bell crank lever 33 arranged in parallel with the levers 27—28, the pendent portion 33ª of the lever forming a heel for engaging a stop bar 34 that limits the backward throw of the several crank levers 27—28 and 33.

By reason of arranging the several parts as shown and described, it is manifest since the several levers 27, 28 and 33 which act as foot levers, (they being disposed below and adjacent the driver's seat 35,) are closely related, either one of them may be easily depressed by the driver's foot, for instance, if he wishes to lift the central drag frame he presses on the lever $x$, if he wishes to raise the outermost one of the side frames he depresses lever $y$ and if he wants to raise the inner one of the side frames he depresses lever $z$ or in case he wants to raise all of the frames he presses down on all of the levers $x$, $y$ and $z$ at the same time.

By arranging the several side frames and providing for lifting them in the manner shown and described, the extreme end frames may be, if desired, readily removed and the other parts used without changing them.

Attention is now directed to Figs. 4 and 8 of the drawings from which it will be seen the forward ends of all of the drags or harrow frames extend beyond the shaft 17 and the rod 21 rockably supported thereon.

One of the objectionable features in lifting drag or harrow frames by lever mechanisms, such as has been heretofore employed, so far as I know, is the weight of the frame requires considerable exertion on the part of the operator and in many instances it necessitates his leaving his seat to properly manipulate the lifting mechanism. In my construction of harrow I have made special provision whereby any one, or more, or all the harrow sections may be swung up without the necessity of the driver leaving the seat and without any special devices other than the lifting means hereinbefore referred to.

As will be seen in Fig. 8, the front ends of the harrow sections or frames extend beyond the shafts 17 and 21 that are correlatively so positioned with respect to the harrows and the lifting mechanisms that when the operator actuates any one or all of the foot lever devices to lift the harrow sections the front ends of the harrow sections will be lifted first their rear ends forming at this time a fulcrum bearing until the front ends rise up and engage the shafts 17 and 21, see Fig. 9, when the said ends form the fulcrum bearings for the said frames, it being understood that the link connections that join them to the wheel carrying shaft hold the frames from creeping backwardly as the final pressure is applied to the foot levers which pressure now applied to the lift chains swings the frames, rear ends upwardly to the position shown in Fig. 10, thereby elevating the frames so their teeth will readily clear any obstruction. By reason of the front ends of the frames engaging the shafts 17 and 21 as stated, and shown, considerable leverage power is produced for facilitating the lift of any one or all of the said frames by means of the ordinary foot pressure from the driver in the seat 35.

The seat is mounted on a transverse arched bar secured to the side members 15—15, the bolt 40 that secures it in the construction shown also serving as a part of the means for fastening the hub bracket 41 that is vertically mounted on the back end of the lever carrying frame and in which is swivelly mounted the usual guide or caster wheel 43.

While I have found the detailed arrangement of the several parts as shown and described, a preferred construction, it is manifest to those skilled in the art to which my invention relates, that the said parts may be readily modified or varied without departing from my invention or the scope of the appended claims.

Having thus described my invention, what I claim and desire to secure by Letters Patent, is:—

1. In a harrow, the combination of a wheeled frame, a drag frame loosely linked at the front end to the wheeled frame, a rigid member that extends across the front end of the drag frame, and a lift means operable from the driver's seat that first raises the front end of the drag frame up against the rigid member and then tilts the said drag frame with the rigid member as the fulcrum therefor.

2. In a harrow that includes a sulky frame, a drag loosely linked to the said frame, a means operable by the driver from his seat adapted when actuated to first lift the front end of the drag frame and then lift the rear end of the said frame while utilizing the front end as a fulcrum bearing.

3. In a harrow, the combination with a sulky frame that includes a front longitudinally extended wheeled axle, and a rearwardly extended sulky frame, and brackets that extend rearwardly from the wheeled axle; of a rock shaft journaled in the brackets, a drag frame having a loose link connection at the front end with the wheeled axle, said front end extending under the rock shaft, crank arms that extend rearwardly from the rock shaft and have link connections with the drag frame, and a foot actuated lever mechanism that connects with and actuates the rock shaft.

4. In a harrow, the combination with a sulky frame that includes a front longitudinally extended wheeled axle, and a rearwardly extended sulky portion, and brackets that extend rearwardly from the wheeled axle; of a hollow rock shaft journaled in the brackets, another rock shaft journaled in the hollow shaft, the two rock shafts having rearwardly extended crank arms, a toothed drag frame for each rock shaft, link members that connect the cranks of the rock shafts with the respective toothed frames, link members for loosely connecting the front end of the drag bars with the wheeled axle and crank and pitman devices mounted on the sulky portion of the frame operable from the driver's seat for actuating the rock shafts to their respective toothed frames.

5. In a harrow of the character described, the combination with the sulky frame including the front wheeled axle and bracket members that extend rearwardly from the axle, and a plurality of drag bars, each having loose link connections with the wheeled axle; of rock shafts journaled in the brackets in parallelism with the wheeled axle, said rock shafts being located over the front ends of the drag frames, each rock shaft having crank members and link connections for coupling with their respective drag frames, a series of bell crank levers mounted on a common shaft on the sulky frame adjacent the driver's seat, each independently operated but adapted to be operated collectively and pitman and crank connections that join the bell crank levers with the several rock shafts.

6. In a harrow, the combination with a sulky frame that includes a front wheeled axle that extends laterally of the sulky portion, the latter forming the support for the driver's seat, a plurality of independently held rock shafts located at each side of the sulky portion and in parallelism with the wheeled axle, a plurality of toothed drag frames, one for each rock shaft, crank and link members that join the said frames with the rock shafts, loose links that join the front ends of the drag frames with the wheeled axle, said front ends extending under the rock shafts and adapted to bear against them when the said front ends are lifted, the connections between the toothed frames and the rock shafts being such that the front ends of the said tooth frames are first elevated to bear against the rock shafts, and means operable from the driver's seat for independently rocking any one or all of the rock shafts.

ANDREW D. IMRIE.

Witnesses:
F. M. AHERN,
JAS. AHERN.